United States Patent
Wang

(10) Patent No.: US 8,295,422 B2
(45) Date of Patent: Oct. 23, 2012

(54) CODE CONTROLLER

(75) Inventor: Dun Wang, Nishinomiya (JP)

(73) Assignee: Furuno Electric Company, Ltd, Nishinomiya-shi (JP)

( * ) Notice: Subject to any disclaimer, the term of this patent is extended or adjusted under 35 U.S.C. 154(b) by 736 days.

(21) Appl. No.: 11/885,578

(22) PCT Filed: Feb. 20, 2006

(86) PCT No.: PCT/JP2006/302932
§ 371 (c)(1),
(2), (4) Date: Apr. 30, 2008

(87) PCT Pub. No.: WO2006/092973
PCT Pub. Date: Sep. 8, 2006

(65) Prior Publication Data
US 2008/0298526 A1    Dec. 4, 2008

(30) Foreign Application Priority Data
Mar. 1, 2005  (JP) .................... 2005-055621

(51) Int. Cl.
H04L 7/02  (2006.01)
(52) U.S. Cl. ...................... 375/359; 375/354
(58) Field of Classification Search ............ 375/359, 375/354
See application file for complete search history.

(56) References Cited

U.S. PATENT DOCUMENTS

| 4,847,861 | A  | * | 7/1989 | Hamatsu et al. | 375/142 |
| 5,438,596 | A  | * | 8/1995 | Sugita | 375/140 |
| 6,388,583 | B1 | * | 5/2002 | Long et al. | 341/50 |
| 6,678,315 | B1 | * | 1/2004 | Hikita et al. | 375/222 |

FOREIGN PATENT DOCUMENTS

| JP | 7-107006 | 4/1995 |
| JP | 11-259276 | 9/1999 |
| JP | 2000-196562 | 7/2000 |

(Continued)

OTHER PUBLICATIONS

English Translation of International Preliminary Report on Patentability Chapter I (IB/373) for PCT/JP2006/302932, Sep. 11, 2007.*

(Continued)

*Primary Examiner* — Shuwang Liu
*Assistant Examiner* — Nader Bolourchi
(74) *Attorney, Agent, or Firm* — Nutter McClennen & Fish LLP; John J. Penny, Jr.; Christina M. Sperry

(57) ABSTRACT

A code controller configures a code state at a substantially constant and low storage volume, and at a substantially constant computational processing amount, regardless of which state position a desired code state is present in within the state area of the code states. In one embodiment, a state processor detects the position of a desired code state based on an inputted code phase amount. Based on the detection, state processor performs processing for jumping the code state a predetermined interval, and obtains a specific code state near the code state. The state processor selects the appropriate process from among a process for delaying the code state one state at a time from the obtained code state and a process for transiting the code state one state at a time in the direction opposite the delay direction, transits the code state, and obtains the desired code state.

14 Claims, 6 Drawing Sheets

FOREIGN PATENT DOCUMENTS

| | | |
|---|---|---|
| JP | 2000-350262 | 12/2000 |
| JP | 2006-041695 | 2/2006 |

OTHER PUBLICATIONS

International Search Report issued on Apr. 4, 2006 in International Application No. PCT/JP2006/302932.

Tsutomu Okada et al., "Jisedai Eisei Koho System Jushinki no Tameno Giji Zatsuon Fugo Seiseiki no Kosei," IEICE Technical Report CAS2002-29, Jun. 21, 2002, pp. 19 to 24.

Tsubasa Uchida et al., "Jisedai Eisei Koho System Taio Hanyo Giji Zatsuon Fugo Seiseiki no Jisso," 2002 IEICE Engineering Sciences Society Taikai Koen Ronbunshu, Aug. 20, 2002, p. 111.

* cited by examiner

CODE CONTROLLER

The present application claims priority to International Patent Application No. PCT/JP2006/302932 filed on Feb. 20, 2006, which claims priority to Japanese Patent Application No. 2005-055621 filed on Mar. 1, 2005, which are herein incorporated by reference.

TECHNICAL FIELD

The present invention relates to a code controller that generates an internal reference code for pseudo-random noise code used to code modulate a positioning signal, and particularly to a code controller that generates a reference code for code made up of partial cutouts of long repetitious code, such as L2 Civil Moderate (L2CM) code and L2 Civil Long (L2CL code found in Global Positioning Systems (GPSs).

BACKGROUND ART

In a Global Navigation Satellite System (GNSS) (including GPS) receiver that receives a GNSS positioning signal and carries out positioning thereby, a pseudo-random noise code generator (this corresponds to the code controller of the present invention, and shall be denoted as "code controller" hereinafter) is provided for receiving the positioning signal.

The code controller comprises a code phase designator, a code state configurator, a code Numerically Controlled Oscillator (NCO), and a code generator. Phase amounts less than the chip unit of the code phase computed by the code phase designator are inputted into the code NCO, whereupon the code NCO generates a code enable signal and outputs the code enable signal to the code generator. Phase amounts of the chip unit of the code phase computed by the code phase designator are inputted into the code state configurator, whereupon the code state configurator configures a desired code state based on the inputted phase amount and outputs the code state to the code generator.

The code generator outputs a code according to the code enable signal inputted from the code NCO, using the code state inputted from the code state configurator.

In such a configuration, the code state configurator stores all code states in advance, and configures the code state by detecting the code state to be applied based on the inputted phase amount.

However, in a conventional code controller, all code states are required to be stored in advance, and because the number of code states depends on the length of the code, an extremely large storage volume is required for long codes. For example, 109.74 megabytes are necessary in order to store all code states of 37 L2CM codes and L2CL codes, as L2CM code is configured of 10,230 chips and L2CL code is configured of 10,230×75 chips.

As a method to solve this problem, non-patent reference 1 discloses a method in which out of all the code states, a plurality of code states of a predetermined interval only are stored in advance, and an appropriate code state close to the desired code state is selected from among the stored code states based on the phase amount. In this method, the appropriate code state is a state previous (the side opposite the delay processing direction) to the desired code state. After this appropriate code state has been configured, the desired code state is found by changing the state of the shift register one state at a time in the direction the code states proceed in (in the delay processing direction). For example, when the case where a code state is stored per 1,024 states is applied to L2CM code and L2CL code, the storage volume is 109.7 kilobytes, but at the cost of the fact that the number of computations performed for processing that causes delay in single-state units is a maximum of 1,023.

Non-patent Reference 1: Okada, Uchida, Onoue, and Shirakawa. Architecture of Pseudo-Random Noise Code Generator for Next-Generation GNSS Receiver. Technical Report of IEICE CAS2002-29; Institute of Electronics, Information, and Communication Engineers.

DISCLOSURE OF INVENTION

Problem to be Solved by the Invention

However, with the code controller according to non-patent reference 1, plural code states configured in accordance with each phase amount controlled are required to be stored for each positioning signal, or in other words, for each positioning satellite. Therefore, when the number of positioning satellites used increases, the amount of code states stored grows along with the increase in satellites, and the storage volume increases as well.

In addition, states are transited one state at a time, through delay processing, from the configured code state to the objective code state; therefore, the delay processing computational amount increases the closer the code state is to the later side (delay side) among two configured code states, and the load on the central processing unit (CPU) grows. This becomes more of a problem the more the configured code state interval increases. In other words, if there are 1,024 state intervals, a maximum of 1,023 computational processes will be required. This problem is solved by reducing the code state interval; however, if the code state interval is reduced, the amount of code states stored grows by that amount, and the storage volume increases as well. In other words, it is desirable to achieve a wide code state interval in order to reduce the storage volume, but too wide an interval increases the processing load.

Accordingly, it is an object of the present invention to provide a code controller that configures a code state and generates code with a substantially constant storage volume less than that of the conventional art regardless of the number of codes used, and with a substantially constant computational processing amount regardless of at what position an objective code state is present within a state area of the code states.

Means for Solving Problem

A code controller according to the present invention comprises a code NCO for generating a code enable signal based on a fractional chip phase in a code phase; a code state configurator, for setting a code state based on an integer chip phase in the code phase, which is configured to include a state processor in order to compute a desired code state by combining a jump process, in which a code state is transited a predetermined number of states forward, and a step process, in which a code state is transited only a single state forward or backward, based on the integer chip phase; and a code generator for generating a code based on the code state in synchronization with the code enable signal.

Through this configuration, the state processor of the code state configurator performs a jump process to the code state closest to the desired code state in a state area of the code states, based on the integer chip phase. This jump process is a computational process that transits the code state a predetermined number of states forward from an initial state used when calculating the phase amount. Next, the state processor performs a step process that moves one state at a time forward or backward relative to the calculated code state, and computes the desired code state. At this time, two processes are set: a step forward process that transits the code state one state in the delay direction of the shift register, and a step back process that transits the code state one state in the opposite direction of the delay direction. Then, one of the step forward process and the step back process is selected and executed, based on the positional relationship in the state space between the code state configured through the jump process and the desired code state.

In addition, the code state configurator of the code controller according to the present invention includes a storage unit which is configured to store a state transition matrix for computing the transition of the code state, and the state processor performs the jump process by using the state transition matrix.

Through this configuration, a state transition matrix is used in the computational processing that transits the code state a predetermined number of states forward. The state transition matrix is a matrix that includes rows and columns of code state bit numbers, and the elements of the matrix depend only on the number of states transited. In other words, if the same state transition matrix is computed for different code states, the state will undergo the same number of transitions. For this reason, one set of the state transition matrixes can be stored for the jump processes performed for all codes.

In addition, the storage unit of the code controller according to the present invention stores the row data or the column data of the state transition matrix as a single variable.

Through this configuration, the columns in which bit computation is performed for each code state in the state transition matrix are not stored as bit strings made up of "0" and "1", but rather are stored as a single variable that expresses the bit string of the row unit or column unit as, for example, a hexadecimal. By performing such processing, a 27-bit bit string, for example, can be converted into a 4-byte variable.

In addition, the state processor of the code controller according to the present invention implements the jump process by dividing all code states into layers and by repeating jump processes on each layer from the high layer down to the low layer.

Through this configuration, the entire code state area is divided into a plurality of partial areas at a predetermined interval (the first layer). Then, the partial areas obtained through this division are divided into a plurality of partial areas at an even finer interval (the second layer). Furthermore, the code state area is layered by repeating such division processing. The state processor performs the aforementioned jump process in the first layer, and then performs a jump process in the second layer at an interval different from the first layer. If lower layers, or in other words, a third layer obtained by dividing the second layer, a fourth layer obtained by dividing the third layer, and so on, are present, a third layer jump process, a fourth layer jump process, and so on are performed in order.

At this time, the jump intervals are the same in each of the layers, and thus a state transition matrix may be stored for each layer; doing so reduces the amount of stored information more than when storing code states individually for each jump position in each layer.

In addition, the state processor of the code controller according to the present invention implements the jump process by performing a first layer jump process in a first layer state area obtained by dividing the entire code state area by a first state interval, and then by performing a second layer jump process in a second layer state area obtained by dividing the first layer state area by a second state interval.

A specific example of the aforementioned layered structure, in which three layers are present, shall be provided in reference to this configuration. In this case, first, a broad jump process is performed in the first layer, and a fine jump process is performed in the second layer. Then, after nearing the desired code state through these two jump processes, the step process is performed and the desired code state is computed. For example, L2CM code consists of 10,230 states; in the first layer, the jump process is performed for 4,096 states, while in the second layer, the jump process is performed for 64 states. In this manner, by utilizing three layers, an appropriate balance can be struck between the storage volume of the state transition matrix used in the jump processes and the computational amount of the step process.

In addition, the code state configurator of the code controller according to the present invention includes a storage unit which is configured to store a code state for a pre-set jump position, and the state processor performs the jump process by using the code state for the jump position and the state transition matrix.

With this configuration, jump processes utilizing the code state is used in one of the layers. For example, a jump process utilizing the code state is performed in the first layer, in which the number of jumps over the entire layer is low. Through this, despite a slight increase in the storage volume, the number of computations for the jump processes is reduced, thus reducing the computational processing load.

Effects of the Invention

According to the present invention, in order to compute a desired code state, first, the state is moved to a predetermined code state closest to the desired code state through jump processes, and then, the state is finely moved through a step forward process or a step back process. Through this, it is possible to realize an optimum computational processing amount in the entire state area of the code state, more than in the case of using jumps and step forwards as in the conventional art.

In addition, according to the present invention, a state transition matrix is stored and utilized; thus it is possible to reduce the storage volume more than when storing the code state of the jump destination, as in the conventional art. In particular, the effect of reducing the storage volume is even further enhanced when the code grows in length and the set number of jump processes increases.

Furthermore, according to the present invention, the rows or columns of the state transition matrix are made into variables, and thus the storage volume can be reduced even further.

Additionally, according to the present invention, the computational processing for the code state is layered; therefore, the jump processes are also layered, and the code state computational efficiency is improved. Here, if a state transition matrix is utilized in the jump process, one set of state transition matrixes may be stored for each layer; thus it is possible to reduce the storage volume more than when storing the code state of the jump destination, as in the conventional art.

In addition, according to the present invention, L2CM code, L2CL code, and the like of a second civilian signal (L2C) are processed in three layers; therefore, the balance between the computational processing amount and the storage volume is improved, and the code state can be computed efficiently.

Furthermore, according to the present invention, by combining a jump process utilizing a state transition matrix and a jump process utilizing a code state, or in other words, by appropriately distributing these processes per layer, the code state can be computed more efficiently.

DESCRIPTION OF REFERENCE NUMERALS

1—Code State Configurator
11—State Processor
12—State Transition Matrix Table
13—State Table
2—Code Generator
3—Code NCO
4—Code Phase Designator

BEST MODE FOR CARRYING OUT THE INVENTION

A code controller according to an embodiment of the present invention shall be described with reference to FIGS. 1 through 6.

Figure 1:
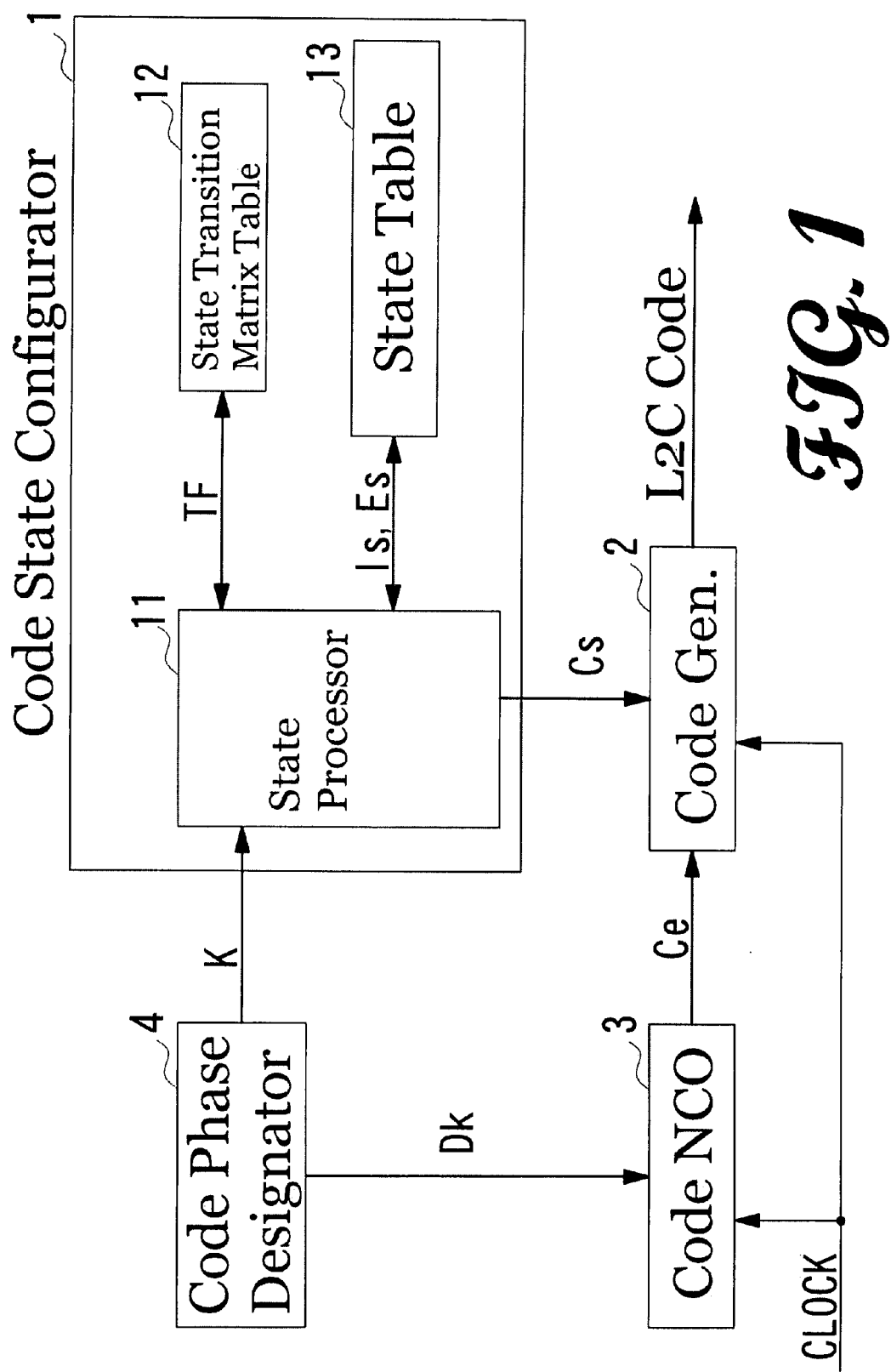
FIG. 1 is a block diagram schematically illustrating a configuration of the code controller according to the present invention.

FIG. 1 is a block diagram schematically illustrating a configuration of the code controller according to the present embodiment.

The code controller according to the present embodiment comprises Code State Configurator 1, Code Generator 2, Code NCO 3, and Code Phase Designator 4.

Code Phase Designator 4 correlates L2C signal code (L2CM code, L2CL code) inputted from a previous stage (not shown) and on which a predetermined demodulation has been performed with a pre-set initial code, and thereby detects the code phase. This code phase is made up of a phase amount K of a chip unit and a phase amount Dk of less than the chip unit, the chip unit being the smallest unit of which code is formed. The chip phase K is outputted to Code State Configurator 1, and the phase amount Dk of less than the chip unit is scale transformed and outputted to Code NCO 3.

Code State Configurator 1 includes State Processor 11, State Transition Matrix Table 12, and State Table 13.

A state transition matrix TF used when performing jump processing, described later, is stored in State Transition Matrix Table 12. Here, the state transition matrix TF stores data of each column as a single variable of plural bytes. Because the L2CM code and L2CL code used for the L2C signal are formed by 27-bit shift register computation, the state transition matrix is a 27×27 matrix. Thus columns are stored as 4-byte (32-bit) variables. While in this example the data of each column is stored as a single variable, the data of each row may be stored as a single variable.

An initial state Is and an end state Es, configured for each positioning satellite, are stored in State Table 13. The initial state Is and end state Es for each positioning satellite are disclosed, and this disclosed data is stored in advance. State Processor 11 reads out the state transition matrix TF from State Transition Matrix Table 12, and reads out the initial state Is and end state Es from State Table 13, and through a method described later based on the chip phase K, processes a code state Cs corresponding to the code obtained by modulating the L2C signal, and outputs the resultant to Code Generator 2.

Code NCO 3 generates a code enable signal Ce based on the phase amount Dk of less than the chip unit and a separately-inputted clock signal CLOCK, and outputs the code enable signal Ce to Code Generator 2.

Code Generator 2 generates and outputs a reference code corresponding to the L2CM code or the L2CL code based on the code state Cs inputted from Code State Configurator 1, the code enable signal Ce inputted from Code NCO 3, and the separately-inputted clock signal CLOCK.

Next, a GPS receiver (not shown) that includes this code controller analyzes a received L2C signal using the reference code generated in this manner, and acquires information modulated with the L2C signal. In addition, the reference code outputted from Code Generator 2 is once again inputted into code phase designator 4, and the code phase is designated. Acquisition and tracking of code is realized by continuing to adjust code based on this code phase.

Next, a method by which Code State Configurator 1 processes the code state shall be explained in further detail using the drawings.

Figure 2:
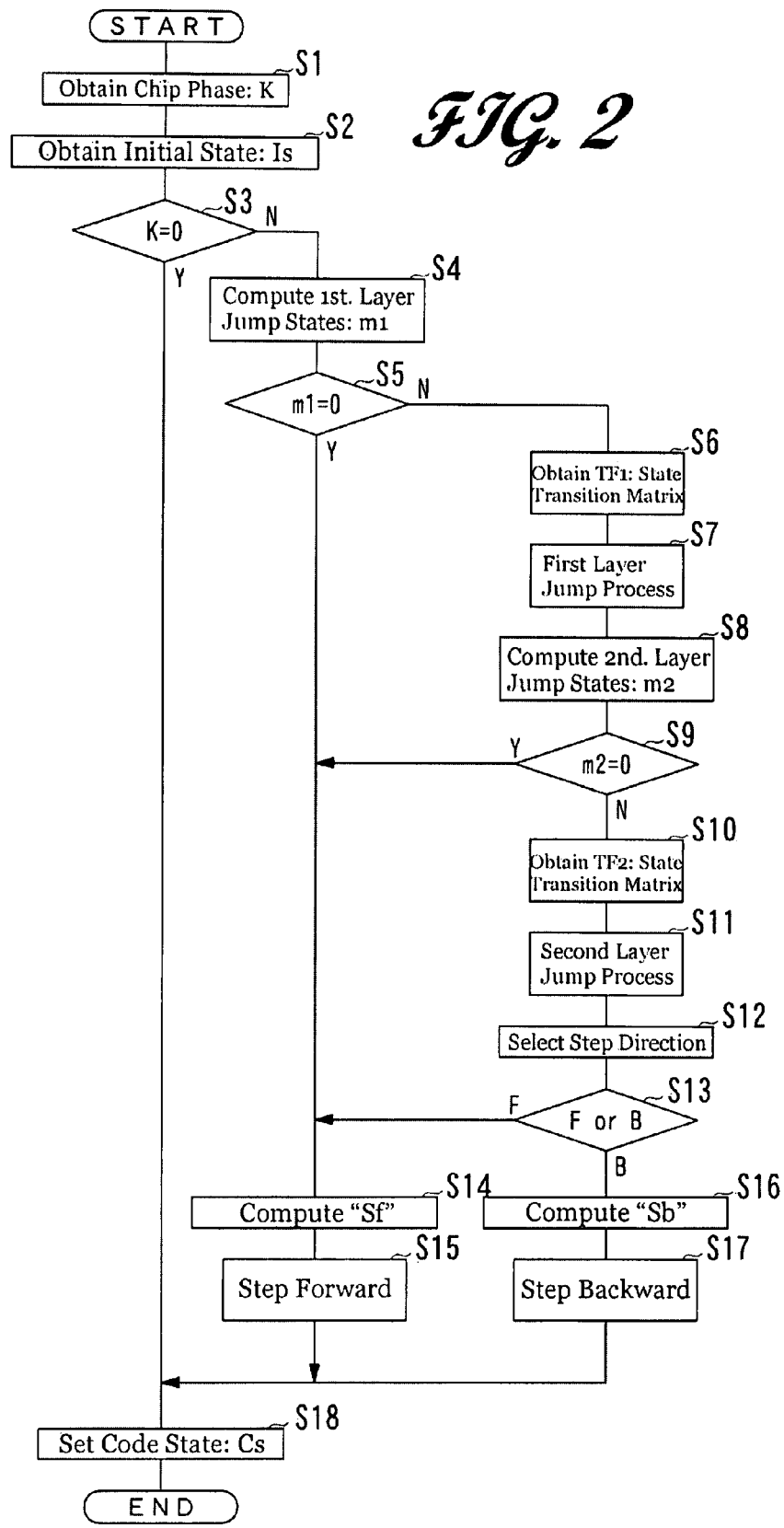
FIG. 2 is a flowchart illustrating a method for processing a code state.
Figure 3:
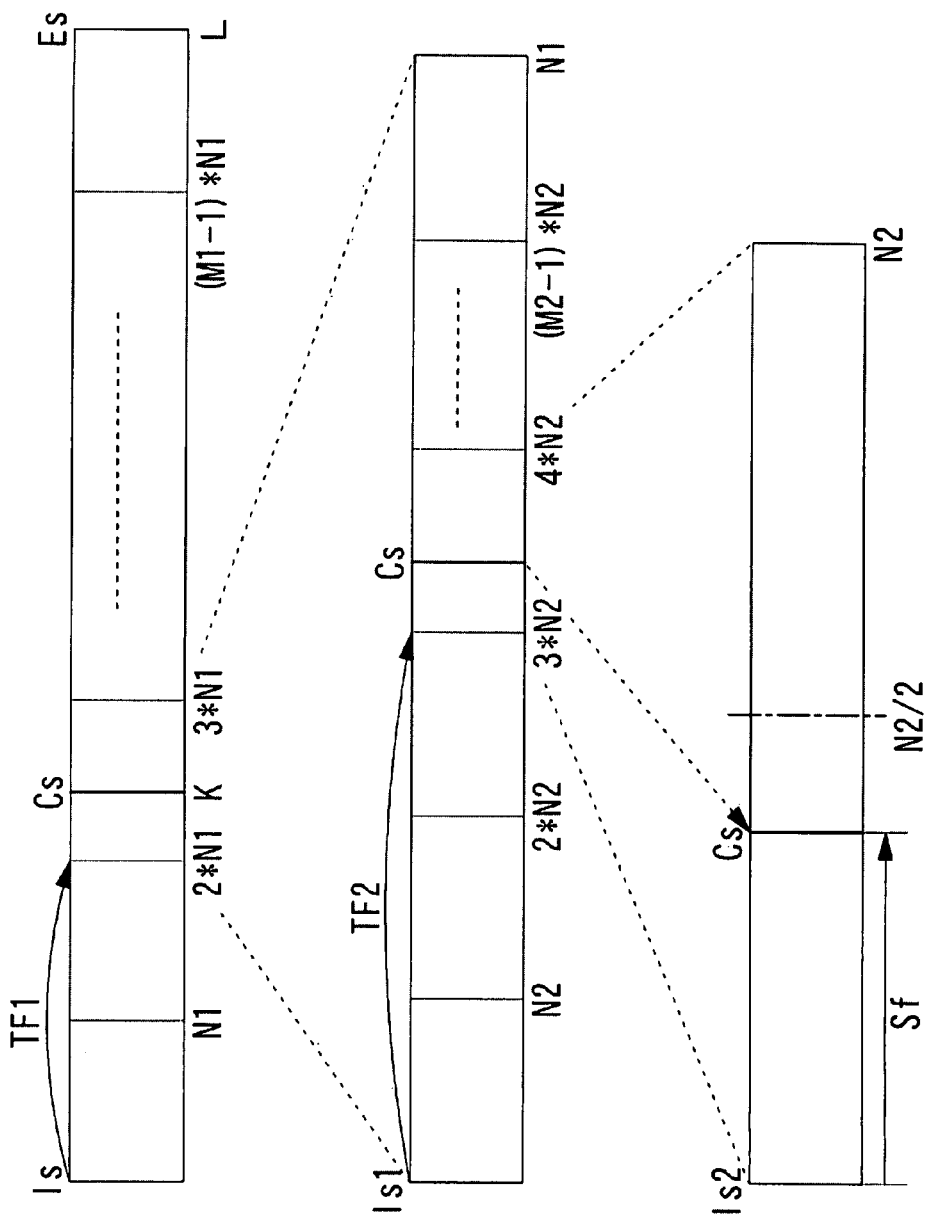
FIGS. 3(A)-3(C) are diagrams schematically illustrating state transition at the time of code state computation.
Figure 4:
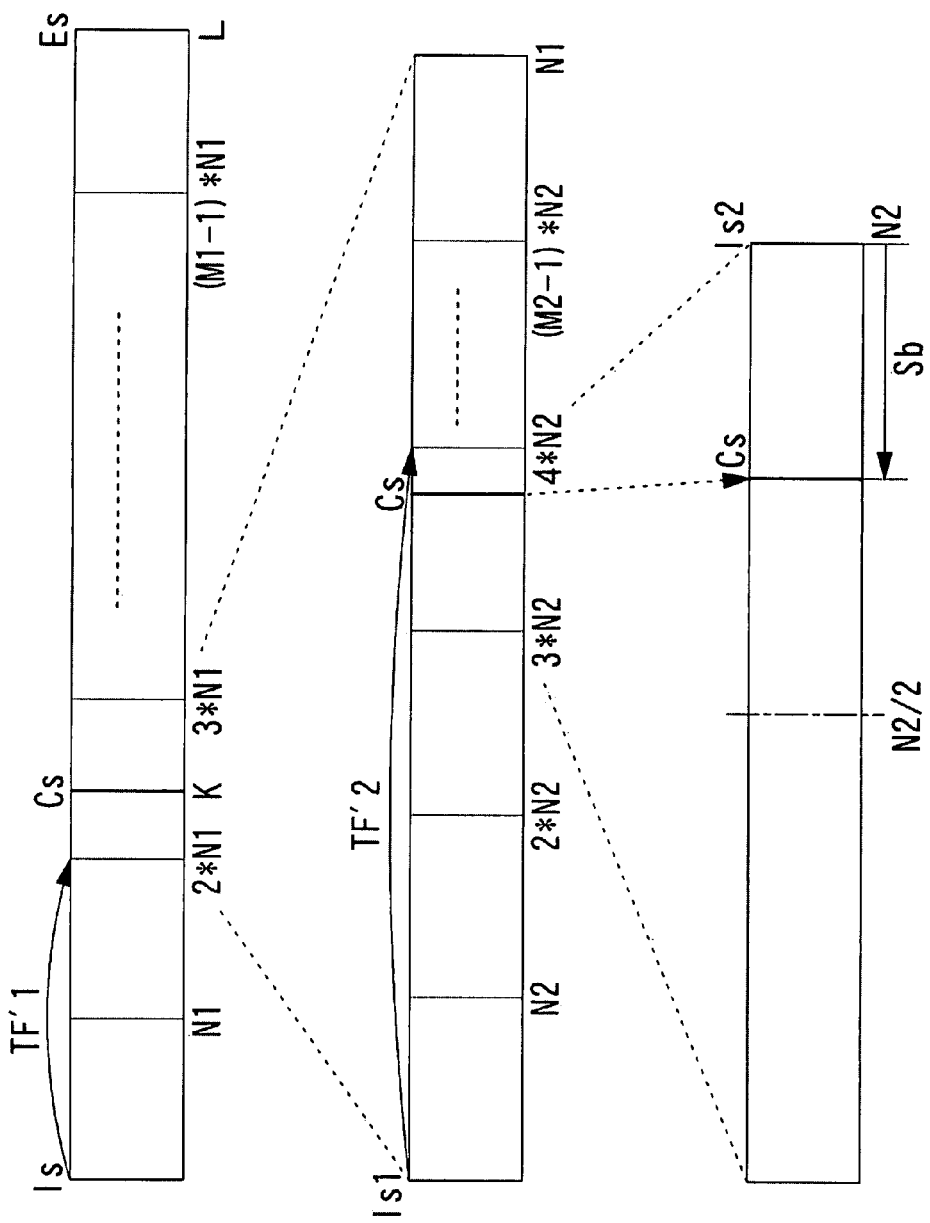
FIGS. 4(A)-4(C) is a diagram schematically illustrating state transition at the time of code state computation.

FIG. 2 is a flowchart illustrating a method for computing the code state. Furthermore, FIGS. 3 and 4 are diagrams schematically illustrating state transition at the time of code state computation. Here, FIGS. 3(A)-3(C) illustrate a case in which a step forward process is carried out in the final layer (third layer), whereas FIGS. 4(A)-4(C) illustrates a case in which a step back process is carried out in the final layer (third layer).

State Processor 11 acquires the chip phase K from code phase designator 4, and reads out the initial state Is stored in State Table 13 (S1->S2). At this time, the read-out initial state Is corresponds to the code configured in the positioning satellite for which the code controller performs code acquisition and tracking.

Here, upon detecting that the chip phase K is "0", or in other words, upon detecting that the inputted code is a code realized by the initial state Is, State Processor 11 sets the code state Cs as the initial state Is and outputs this to Code Generator 2 (S3->S18).

However, upon detecting that the chip phase K is not "0", State Processor 11 calculates a first layer jump amount m1 (S4). The first layer is, as shown in FIGS. 3 and 4, a layer in which M1 number of partial areas are formed by dividing a state space, made up of the number of all states L from the initial state Is to the end state Es, by a predetermined state interval N1. The first layer jump amount m1 is a computational value for causing the state to jump to a code state close to the configured code state, among the code states that form the boundaries between the M1 partial areas the state space has been divided into. Assuming INT is an integer calculation, the first layer jump amount m1 is given by $$m1 = INT(K/N1)$$

State Processor 11 computes a forward step number Sf if the calculated first layer jump amount m1 is "0" (S5->S14). In this case, the forward step number Sf is given by Sf=K.

Then, State Processor 11 performs state transition processing on the code state in the delay direction (the direction of the shift in a code generation shift register), or in other words, performs step forward processing, using the computed forward step number Sf, and configures the desired code state Cs (S15->S18).

State Processor 11 reads out a state transition matrix TF1 corresponding to the computed first layer jump amount m1 from State Transition Matrix Table 12 if the calculated first layer jump amount m1 is not "0" (S5->S6). State transition matrixes TF1 corresponding to respective first layer jump amounts m1 are stored within State Transition Matrix Table 12. To be more specific, these state transition matrixes TF1 are matrixes found by multiplying fundamental state transition matrixes TF0 used in performing calculation for transiting the code state one step in the delay direction by the first layer jump amount m1, and are configured for each first layer jump amount m1.

State Processor 11 performs a first layer jump process using the read-out state transition matrix TF1 (S7). The first layer jump process is a process for computing the code state corresponding to a second layer initial state Is1 by multiplying the state transition matrix TF1 with the initial state Is. Expressing this as a matrix algebraic equation results in the following equation.

$$Is1 = TF1 \cdot Is$$

Figure 5:
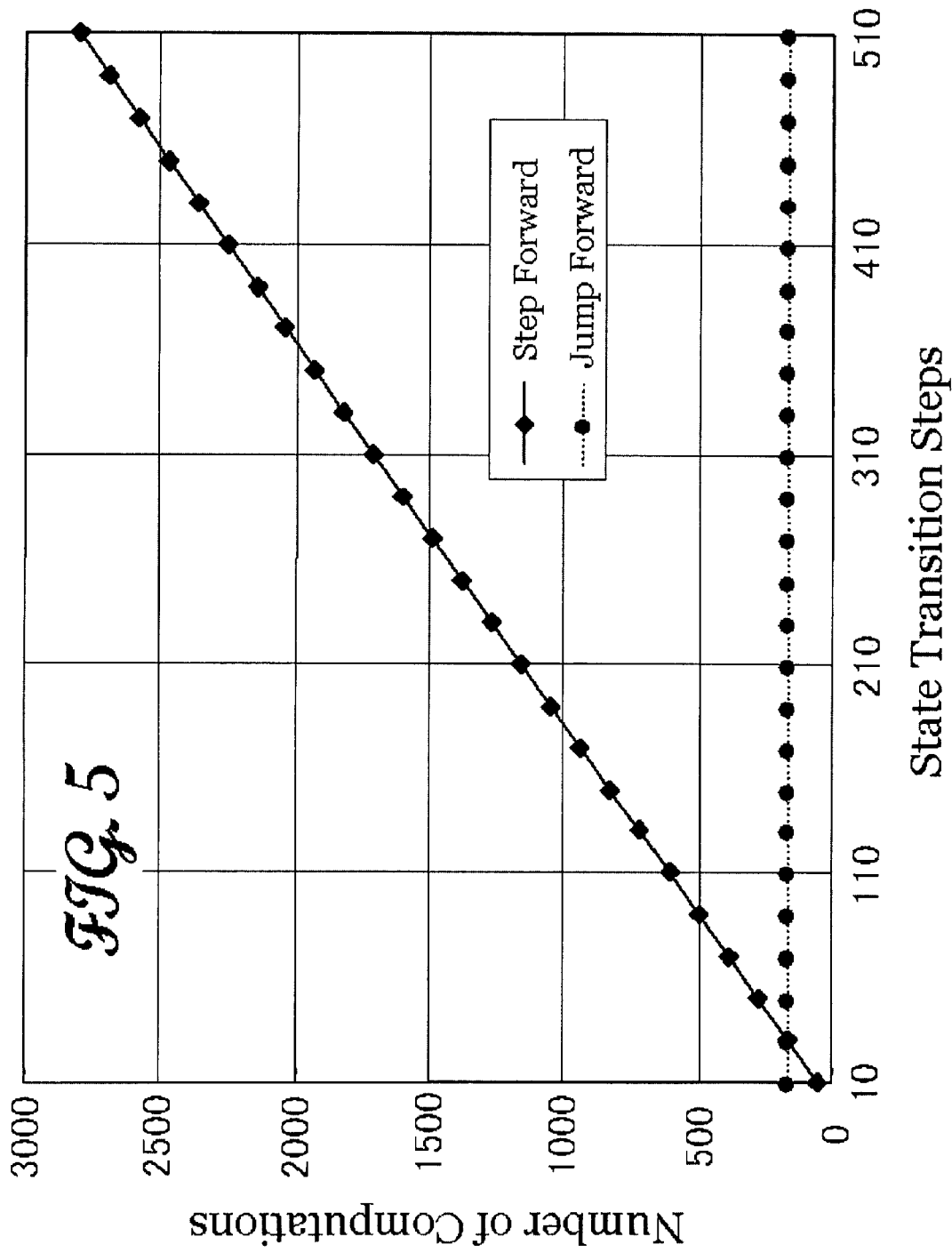
FIG. 5 is a graph indicating the dependence of the computational processing amount of the jump process and step process on the state transition amount.

In this jump processing, the computational processing amount does not depend on the state transition amount. FIG. 5 is a graph indicating the dependence of the computational processing amount of the jump process and step process on the state transition amount. This graph indicates state transition processing on code of an L2C signal configured through 27-bit shift register computation. As shown in FIG. 5, while the computational processing amount per single jump process using the state transition matrix is high, it does not depend on the state transition amount, and is constant. However, while the computational processing amount for one step of the step process is low, it depends on the state transition amount (number of state transition steps), and increases linearly. For this reason, under the conditions shown in FIG. 5, it is possible to make the computational processing amount of the jump process using the state transition matrix lower than the computational processing amount of the step process if the number of steps exceeds 30.

Next, State Processor 11 calculates a second layer jump amount m2 using the calculated second layer initial state Is1 as a reference (S8). The second layer is, as shown in FIGS. 3 and 4, a layer in which M2 number of partial areas are formed by dividing a state space, made up of the number of states N1 starting from the initial state Is1, into predetermined state intervals N2. The second layer jump amount m2 is a computational value for causing the state to jump to a code state close to the configured code state, among the code states that form the boundaries between the M2 partial areas the state space has been divided into. Assuming INT is an integer calculation, and MOD is a remainder operation, M1=MOD(K/N1), and the second layer jump amount m2 is given by $$m2 = INT(M1/N2)(M1 - m2 \cdot N2 < N2/2) \quad (1)$$

or $$m2 = INT(M1/N2) + 1(M1 - (m2-1) \cdot N2 > N2/2) \quad (2)$$

In other words, two second-layer border code states that sandwich the desired code state Cs in the state space are compared, and the second layer jump amount m2 is selected so as to jump to the code state closer to the desired code state Cs. For example, in the case where the nearest bordering code state is smaller than the desired code state Cs, as shown in FIG. 3(C), the second layer jump amount m2 is calculated through equation (1). However, in the case where the nearest bordering code state is greater than the desired code state Cs, as shown in FIG. 4(C), the second layer jump amount m2 (equivalent to TF2 or TF'2) is calculated through equation (2).

State Processor 11 computes a forward step number Sf if the calculated second layer jump amount m2 is "0" (S9->S14). In this case, the forward step number Sf is given by Sf=M1. Then, State Processor 11 performs state transition processing on the code state in the delay direction (the direction of a shift in a code generation shift register) using the computed forward step number Sf, and configures the desired code state Cs (S15->S18).

State Processor 11 reads out a state transition matrix TF2 (or TF'2) corresponding to the computed second layer jump amount m2 from State Transition Matrix Table 12 if the calculated second layer jump amount m2 is not "0" (S9->S10). State transition matrixes TF2 (or TF'2) corresponding to respective second layer jump amounts m2 are stored within State Transition Matrix Table 12. To be more specific, these state transition matrixes TF2 (or TF'2) are matrixes found by multiplying fundamental state transition matrixes TF0 that perform calculation for transiting the code state one step in the delay direction by the second layer jump amount m2, and are configured for each second layer jump amount m2.

State Processor 11 performs second layer jump processing using the read-out state transition matrix TF2 (or TF'2) (S11). The second layer jump process is a process for computing the code state corresponding to a third layer initial state Is2 by multiplying the state transition matrix TF2 (or TF'2) with the second layer initial state Is1. Expressing this as a matrix algebraic equation provides $$Is2 = TF2 \cdot Is1 \text{ or } Is2 = TF'2 \cdot Is1$$

Next, State Processor 11 selects one of a step forward process and a step back process using the calculated third layer initial state Is2 as a reference. To be more specific, the step forward process is selected in the case where the initial state Is2 is obtained from the second layer jump amount m2 calculated using equation (1), and the step back process is selected in the case where the initial state Is2 is obtained from the second layer jump amount m2 calculated using equation (2) (S13).

State Processor 11 computes a forward step number Sf in the case of selecting the step forward process (S14). In this case, the forward step number Sf is given by Sf=M1−m2·N2. Then, State Processor 11 performs state transition processing on the code state in the delay direction (the direction of a shift in a code generation shift register) using the computed forward step number Sf, and configures the desired code state Cs (S15->S18).

State Processor 11 computes a backward step number Sb in the case of selecting the step back process (S16). In this case, the backward step number Sb is given by Sb=M1−(m2−1)·N2. Then, State Processor 11 performs state transition processing on the code state in the direction opposite the delay direction (the opposite direction of a shift in a code generation shift register) using the computed backward step number Sb, and configures the desired code state Cs (S17->S18).

The above processing shall be described using a specific example referring to FIGS. 3 and 4.

First, in the case of FIGS. 3(A)-3(C), upon being inputted with the code phase K, State Processor 11 detects the state position thereof in the first layer formed when the total number of states L is divided by the state interval N1, in order from the initial state Is to the end state Es. Then, the first layer jump amount m1 is computed, and the state transition matrix TF1 corresponding thereto is read out. State Processor 11 computes the code state Is1 of the jump state position 2*N1 from the state transition matrix TF1 and the initial state Is, and sets this code state Is1 as the initial state of the second layer. State Processor 11 then detects the state position corresponding to the code phase K in the second layer, the second layer being formed by dividing the partial areas of the first layer by a state interval N2 that is finer than the state interval N1. Then, the second layer jump amount m2 is calculated, and the state transition matrix TF2 corresponding thereto is read out. State Processor 11 computes the code state Is2 of the jump state position 3*N2 from the state transition matrix TF2 and the second layer initial state Is1, and sets this code state Is2 as the initial state of the third layer. State Processor 11 performs a step forward process using the set third layer initial state Is2 and the computed forward step number Sf, and configures the desired code state Cs.

On the other hand, in the case of FIGS. 4(A)-4(C), upon being inputted with the code phase K, State Processor 11 detects the state position corresponding to this code phase K in the first layer. Then, the first layer jump amount m1 is computed, and the state transition matrix TF'1 corresponding thereto is read out. State Processor 11 computes the code state Is1 of the jump state position 2*N1 from the state transition matrix TF'1 and the initial state Is, and sets this code state Is1 as the initial state of the second layer. State Processor 11 then detects the state position corresponding to the code phase K in the second layer. Then, the second layer jump amount m2 is computed, and the state transition matrix TF'2 corresponding thereto is read out.

State Processor 11 computes the code state Is1 of the jump state position 2*N1 from the state transition matrix TF'1 and the initial state Is, and sets this code state Is1 as the initial state of the second layer. State Processor 11 then detects the state position corresponding to the code phase K in the second layer. Then, the second layer jump amount m2 is computed, and the state transition matrix TF'2 corresponding thereto is read out. State Processor 11 computes the code state Is2 of the jump state position 4*N2 from the state transition matrix TF'2 and the second layer initial state Is1, and sets this code state Is2 as the final state of the third layer. State Processor 11 performs a step back process using the set third layer final state Is2 and the computed backward step number Sb, and configures the desired code state Cs.

Here, descriptions shall be given regarding the storage volume and computational processing amount in the case where an L2C signal specifically is applied in the layered processing shown in FIGS. 3 and 4. In the layered processing shown in FIGS. 3 and 4, a maximum of 162+162+5.5×N2/2 number of computations is required as the calculation amount for processing from the initial state to an arbitrary code state in each code of an L2C signal. In addition, it is necessary to calculate and store, in advance, (M1-1) state transition matrixes TF1 in the first layer jump process and (M2-1) state transition matrixes TF2 in the second layer jump process, and thus the necessary storage volume is 108×(M1+M2-2) bytes.

For example, assume N1=4096 and N2=64. L2CM code has a code length of 10,230 chips, meaning there are 10,230 states in the entire state space, and thus M1 is 3, while M2 is 64. In this case, the necessary storage volume is 7,020 bytes, and the maximum amount of computational processes is 500. L2CL code has a code length of 10,230×75 chips, meaning there are 10,230×75 states in the entire state space, and thus M1 is 188, while M2 is 64. In this case, the necessary storage volume is 27,000 bytes, and the maximum amount of computational processes is 500, the same as the L2CM code. The CM code and CL code are both taken from the same pseudo-random noise code, and thus the state transition matrixes thereof are identical. In addition, in order to generate 37 CM codes and CL codes corresponding to the number of positioning satellites, it is necessary to store the respective initial states and end states. Taking this into consideration, when computing the code state of an L2C signal in a three-layer structure where N1=4,096 and N2=64, the necessary storage volume is approximately 27 KB, and the maximum amount of computational processes is 500. In this manner, by using the configuration and process of the present embodiment, the storage volume and maximum amount of computational processes are both reduced.

Through the processing as described above, it is possible to significantly reduce the storage volume more than the conventional art that stores all states, by appropriately utilizing the jump process in which a predetermined code state is obtained without the computational processing amount depending on the state transition amount, and the step forward and step back processes, in which the computational processing amount does depend on the state transition amount but code states are obtained per state. In addition, it is possible to significantly reduce the maximum computational processing amount more than a method that computes code states through step forward processes from the initial state.

Furthermore, by selecting and utilizing the step forward processes and step back processes based on the position of the desired code state, it is possible, compared to step processing the desired code state after performing a jump process as in non-patent reference 1, to reduce the computational processing amount in the layer in which the step processing is performed by half.

Moreover, by using the state transition matrix in the jump process, the storage volume used for the jump process can be reduced more than storing the code state of the jump position and then performing the jump process, as in non-patent reference 1. This is because the state transition matrix depends only on the number of steps transited, and does not differ depending on the position of the code state in the state space; hence it is sufficient to store only the initial state and the state transition matrix according to the jump amount of each layer. This effect grows the greater the state space becomes relative to the code, or in other words, the longer the code becomes, and thus can be utilized effectively for L2CM code and L2CL code used in L2C signal. Furthermore, while the code is set per positioning satellite, it is sufficient to store only the initial state of each code and a common state transition matrix for all when utilizing the configuration of the present embodiment. Accordingly, while the storage volume has conventionally increased significantly along with an increase in positioning satellites, with the aforementioned configuration, only the initial states and end states increase, and there is no need to newly store state transition matrixes. This effect furthers the effect of reducing the storage volume.

In addition, by layering the processing of the code states, state transition matrixes are stored for each layer; however, state transition matrixes are used in dependence on the state transition amount regardless of the state position within the layer. For this reason, one set of state transition matrixes may be stored for each layer, which makes it possible to reduce the storage volume more than when storing all code states for jump positions in each of the layers.

Furthermore, storing the column data of the state transition matrixes as a single variable of a predetermined number of plural bytes makes it possible to reduce the storage volume even more than when simply storing the column data.

As described thus far, by using the configuration and processing of the present embodiment, it is possible to generate a desired code without influence being exerted on the code number, code length, and the like of the generated code, with a substantially constant storage volume less than that of the conventional art. Furthermore, it is possible to configure a code state and generate code at a substantially constant computational processing amount regardless of which state position the code state is present in within the state space of the code states.

Note that in the aforementioned embodiment, the descriptions provided described the jump process as being performed in both the first and second layers. However, in the first layer, in which the state interval jumped is large, or in other words, in which there are few state positions obtained through the jump process, the code state of the jump position may be stored, read out, and the jump process may then be performed.

Figures 6A, 6B, 6C:
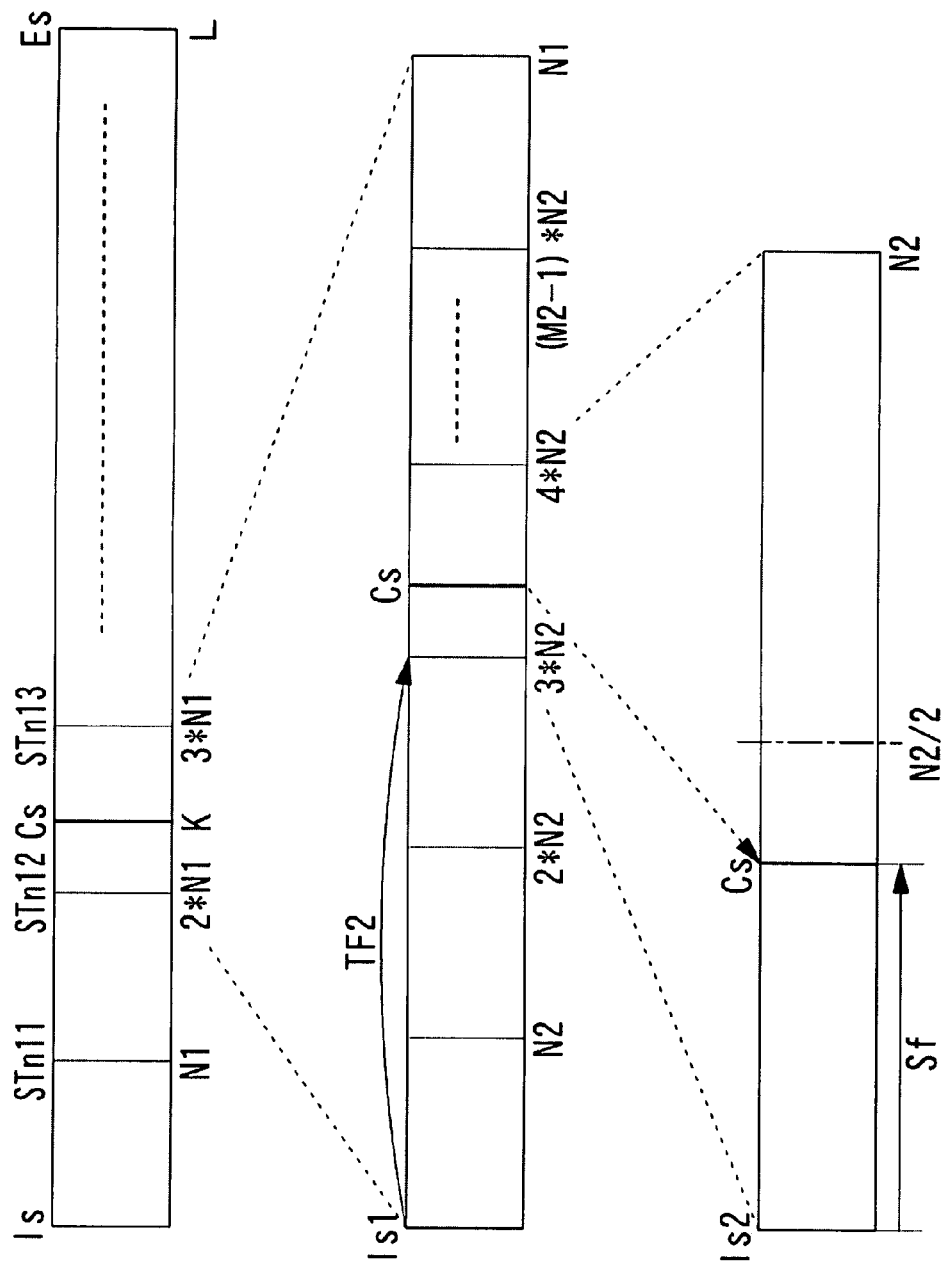
FIGS. 6(A)-6(C) are diagrams schematically illustrating state transition at the time of code state computation.

FIGS. 6(A)-6(C) are diagrams schematically illustrating state movement at the time of code state computation.

As shown in FIGS. 6(A)-6(C), in this configuration, code states of the jump positions in the first layer (STn11, STn12, STn13, and so on) are stored in advance, and an appropriate code state is detected based on the inputted code phase K and the state interval N1. The processing for the second layer on is the same is in the aforementioned embodiment. FIGS. 6(A)-6(C) are diagrams schematically illustrating state transition at the time of code state computation.

By using such a configuration, the storage volume increases slightly for the first layer, more than when computing all jump processes using the state transition matrix. However, because the read-out code state may be applied as-is without computing a state transition matrix, it is possible to reduce the computational processing amount. Through this, it is possible to set an optimum storage volume and computational processing amount in accordance with the necessary device specifications.

The invention claimed is:

1. A code controller comprising:
a code Numerically Controlled Oscillator (NCO) for generating a code enable signal based on a fractional chip phase in a code phase;
a code state configurator, for setting a code state based on an integer chip phase in the code phase, which is configured to include a state processor in order to compute a desired code state by combining a jump process, in which a code state is transited a predetermined number of states forward, and a step process, in which a code state is transited only a single state forward or backward, based on the integer chip phase,
wherein the state processor implements the jump process by performing a first layer jump process in a first layer state area, and then by performing a second layer jump process in a second layer state area; and
a code generator for generating a code based on the code state in synchronization with the code enable signal.

2. The code controller according to claim 1, wherein the code state configurator includes a storage unit which is configured to store a state transition matrix for computing the transition of the code state, and
the state processor performs the jump process by using the state transition matrix.

3. The code controller according to claim 2, wherein the storage unit stores the row data or the column data of the state transition matrix as a single variable.

4. The code controller according to claim 1, wherein the state processor implements the jump process by dividing all code states into layers and by repeating jump processes on each layer from the high layer down to the low layer.

5. The code controller according to claim 4, wherein the state processor implements the jump process by performing the first layer jump process in the first layer state area obtained by dividing the entire code state area by a first state interval, and then by performing the second layer jump process in the second layer state area obtained by dividing the first layer state area by a second state interval.

6. The code controller according to claim 2, wherein the code state configurator includes a storage unit which is configured to store a code state for a pre-set jump position, and
the state processor performs the jump process by using the code state for the jump position and the state transition matrix.

7. The code controller according to claim 2, wherein the state processor implements the jump process by dividing all code states into layers and by repeating jump processes on each layer from the high layer down to the low layer.

8. The code controller according to claim 3, wherein the state processor implements the jump process by dividing all code states into layers and by repeating jump processes on each layer from the high layer down to the low layer.

9. The code controller according to claim 3, wherein the code state configurator includes a storage unit which is configured to store a code state for a pre-set jump position, and
the state processor performs the jump process by using the code state for the jump position and the state transition matrix.

10. The code controller according to claim 4, wherein the code state configurator includes a storage unit which is configured to store a code state for a pre-set jump position, and
the state processor performs the jump process by using the code state for the jump position and the state transition matrix.

11. The code controller according to claim 5, wherein the code state configurator includes a storage unit which is configured to store a code state for a pre-set jump position, and
the state processor performs the jump process by using the code state for the jump position and the state transition matrix.

12. The code controller according to claim 1, wherein the code state configurator sets the code state and the code generator generates the code at a substantially constant computational processing amount regardless of which state position the code state is present in within a state space of code states.

13. The code controller according to claim 4, wherein the state processor performs the jump process starting in the high layer and then in a next highest layer at an interval different from the high layer.

14. The code controller according to claim 4, wherein:
the state processor implements the jump process by dividing all code states into layers,
the code state configurator includes a storage unit which is configured to store a state transition matrix for each of the layers for computing the transition of the code state, and
the state processor performs the jump process by using the state transition matrices.

* * * * *